United States Patent [19] [11] Patent Number: 4,591,312
Wenglarz [45] Date of Patent: May 27, 1986

[54] PARTICLE LADEN FLUID POWERED GAS TURBINE AND LIKE APPARATUS AND METHOD OF OPERATION

[75] Inventor: Richard A. Wenglarz, Export, Pa.

[73] Assignee: Electric Power Research Institute, Palo Alto, Calif.

[21] Appl. No.: 525,111

[22] Filed: Aug. 22, 1983

[51] Int. Cl.⁴ .............................................. F01D 25/00
[52] U.S. Cl. ................................ 415/121 R; 415/182; 415/208; 55/306; 60/39.092
[58] Field of Search ............... 415/121 A, 121 R, 168, 415/182, 183, 185, 199.5, 193, 208; 60/39.092; 55/306

[56] References Cited

U.S. PATENT DOCUMENTS

| 3,066,912 | 12/1962 | Scheper, Jr. | 415/121 A |
|---|---|---|---|
| 3,137,477 | 6/1964 | Kofink | 415/166 |
| 3,146,722 | 9/1964 | Warman | 415/205 |
| 3,362,155 | 1/1968 | Driscoll | 60/39.092 |
| 3,465,950 | 9/1969 | Freid et al. | 415/183 X |
| 3,664,761 | 5/1972 | Zastrow | 415/205 |
| 3,673,771 | 7/1972 | Dickey | 55/306 |
| 3,737,247 | 6/1973 | Horning | 415/195 |
| 4,177,005 | 12/1979 | Bozung et al. | 415/128 |
| 4,274,804 | 6/1981 | Teshima et al. | 415/121 A |

FOREIGN PATENT DOCUMENTS 1181829  6/1959  France ........................... 415/121 A Primary Examiner—Robert E. Garrett
Assistant Examiner—Joseph M. Pitko
Attorney, Agent, or Firm—Flehr, Hohbach, Test, Albritton & Herbert

[57] ABSTRACT

A fluid flow driven apparatus, specifically a gas-powered turbine, which is especially designed to operate on particle laden fluid is disclosed herein along with its method of operation. This apparatus includes a main drive shaft disposed within its own compartment and a plurality of rotor blades fixedly connected to the shaft at axially spaced locations along its length. The apparatus also includes means for directing a continuous fluid stream, laden with particles, into the compartment, and means for causing the fluid stream in the compartment to move axially therethrough along a helical path around the shaft in order to engage the rotor blades in a way which causes the shaft to rotate about its own axis. In addition, the apparatus includes a particle redistribution arrangement acting on the particle laden fluid stream at a location upstream of the rotor blades in a way which acts on the particles for causing the latter to impinge the rotors, especially the most upstream of the rotors, in a more favorable manner than would be the case without the particle redistribution arrangement.

4 Claims, 5 Drawing Figures

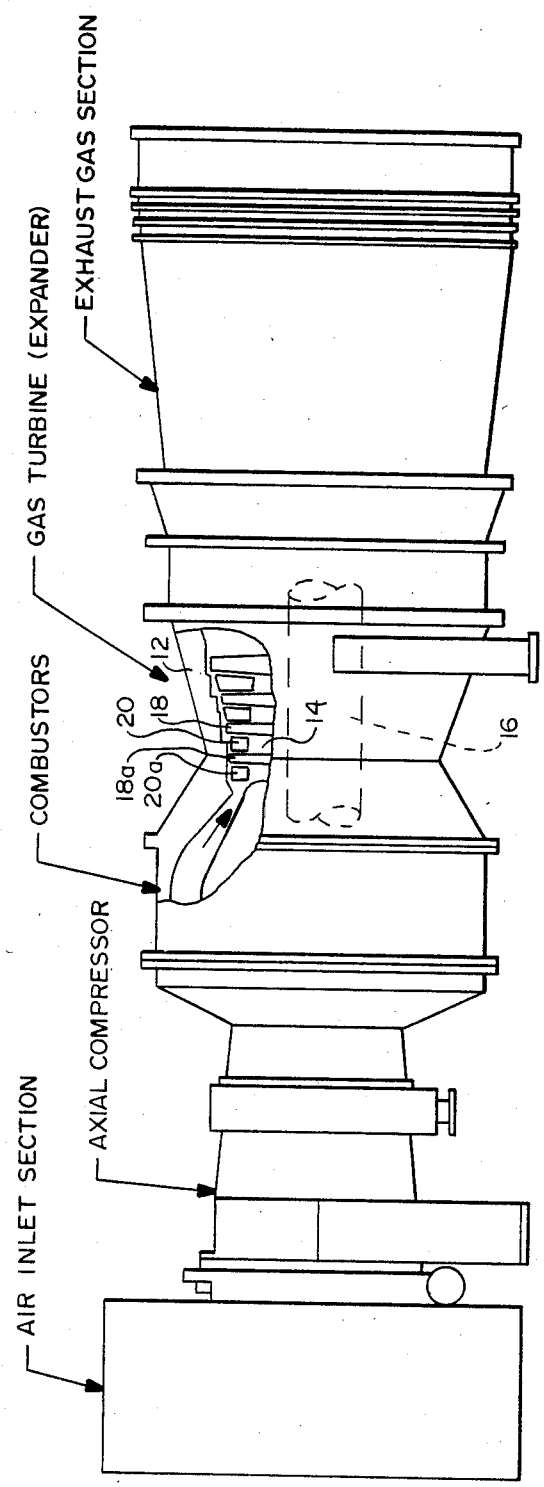
FIG.—1
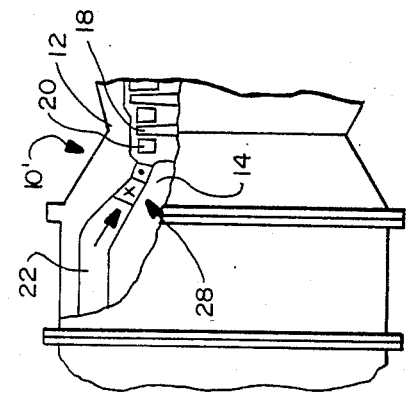
FIG.—4
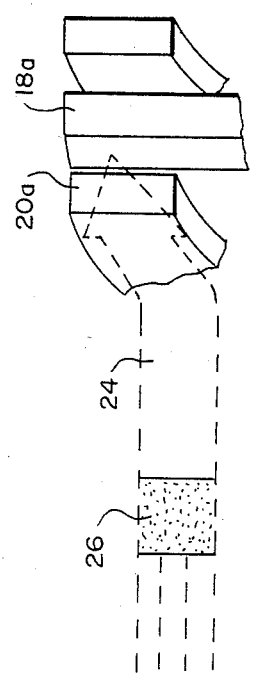
FIG.—2

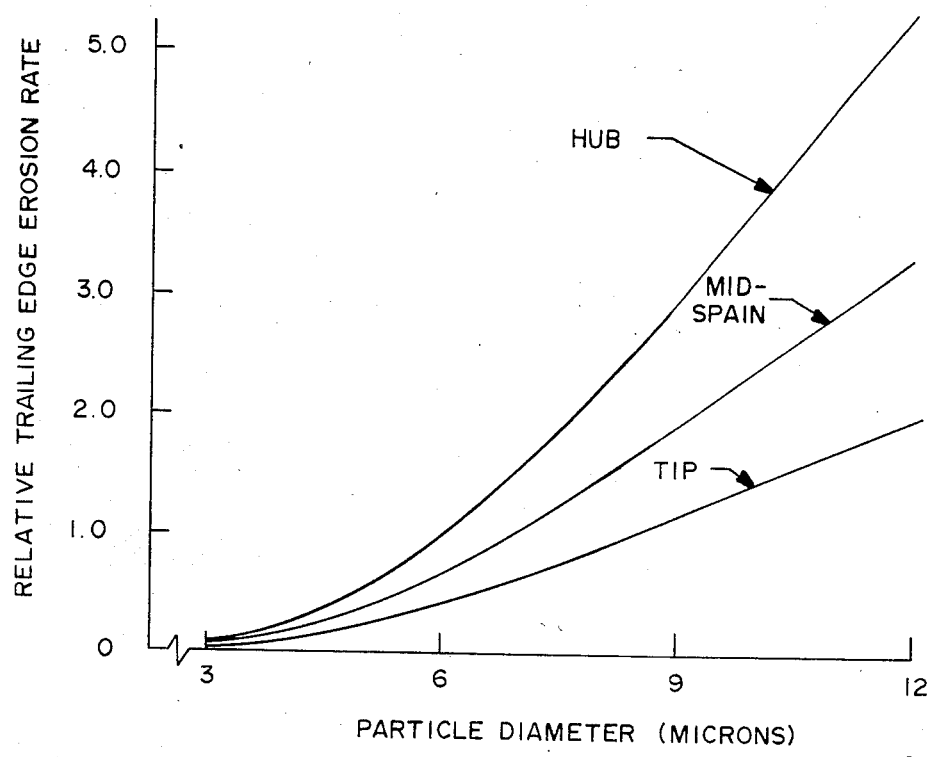
FIG.—3
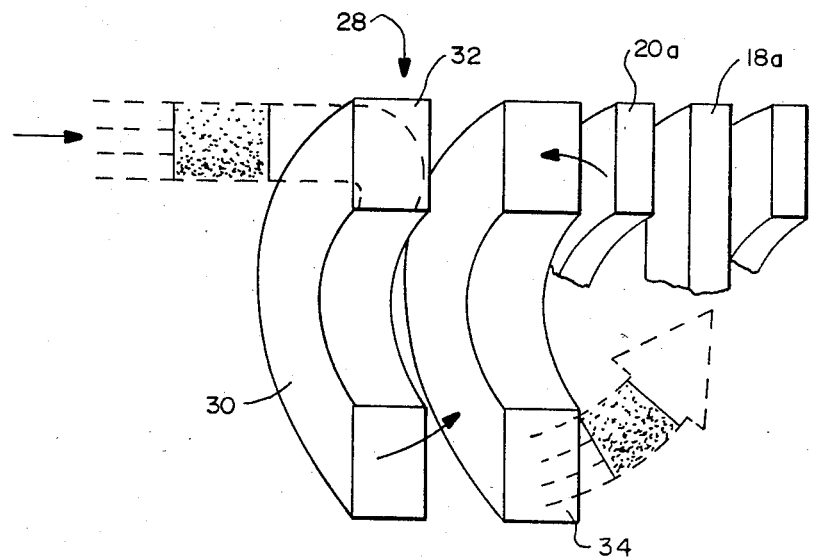
FIG.—5

PARTICLE LADEN FLUID POWERED GAS TURBINE AND LIKE APPARATUS AND METHOD OF OPERATION

The present invention relates generally to a fluid flow driven apparatus such as a gas turbine and more particularly to one which is especially designed to be powered by a particle laden fluid.

Gas turbines and other fluid flow driven apparatus can operate with external combustion processes which produce particle laden gases. Such applications include PFBC (pressurized fluidized bed combustion) and power recovery from processes such as blast furnaces or catalytic crackers. Although cleanup devices can remove particles from the process gases prior to entering the turbine (or other apparatus), complete particle removal is not possible and limited quantities of particles are ingested by the turbine. These particles can erode turbine vanes or rotor blades to reduce their structural integrity and degrade flow path aerodynamics and power output. Consequently, periodic vane and blade replacement is necessary to sustain turbine power output at acceptable levels or present structural failure of a vane or blade and resultant damage to downstream stages. The costs for replacement of eroded vanes and blades are substantial, amounting to as much as $1 million per stage of a four-stage large utility turbine. The cost of lost turbine power during vane and blade replacement can also be substantial, amounting to many thousands of dollars per day for a large utility turbine.

In view of the foregoing, it is an object of the present invention to control turbine erosion in order to increase the interval between blade and vane replacements and thereby reduce costs of maintenance and lost power.

A more particular object of the present invention is to provide an uncomplicated and yet reliable way to redistribute the particles in the particle laden fluid which is used to drive the gas turbine or like apparatus before the fluid reaches the turbine's vanes and blades such that the particles impinge the latter, especially the upstream-most blade and vane, in a more uniform manner than would be the case in the absence of the particle redistribution.

As will be seen hereinafter, the gas turbine or like apparatus disclosed herein is one which utilizes means including an elongated drive shaft mounted for rotation about its own axis and a plurality of rotor blades fixedly connected to the shaft at axially spaced locations along its length. The apparatus also includes means defining a compartment for maintaining at least a portion of the drive shaft which supports the rotor blades and means for directing a continuous fluid stream, laden particles, into the compartment. A plurality of vanes also mounted within the compartment, or other suitable flow deflecting means, are provided for causing the fluid stream entering the compartment to move axially therethrough along a helical path around the drive shaft in order to engage the rotor blades in a way which causes the shaft to rotate about its own axis. In accordance with the present invention, the apparatus is provided with particle redistribution means acting on the fluid stream at a location upstream of the rotors which places more particles within the stream radially further from the axis of the drive shaft as the fluid initially moves into the helical path than would be the case without the particle redistribution means, whereby to redistribute the particles outwardly relative to the drive shaft as they engage the rotors. Without this redistribution of particles, they tend to impinge on the rotor blades at points relatively close to the shaft which are more prone to erosion than at points further therefrom. By redistributing the particles radially outwardly the erosion rates on the blade, especially the upstream-most blade, are more uniform, thereby extending rotor life from the standpoint of erosion due to particle laden fluids.

In the particular embodiment of the present invention disclosed herein, the rotor blades may be separated into three radial segments, an inner hub segment closest to the shaft, an outer tip segment furthest from the shaft, and a mid-span segment therebetween. Without the particle redistribution technique disclosed herein, a relatively uniform percentage of particles within the stream would engage the hub segment of the upstream-most one of the rotors and its mid-span or tip segments. The particle redistribution technique redistributes the particles so that they engage the rotor blades, especially the upstream-most blades in a non-uniform manner along its radius so that lower fraction of particles impinge on areas most prone to erosion. In the disclosed embodiment, this is accomplished by providing means for redirecting the paticle laden fluid stream along its own spiral path before reaching the upstream-most rotor blade whereby to centrifugally redistribute the particles in the stream outwardly before they reach the upstream-most blade.

The present invention will be described in more detail hereinafter in conjunction with the drawings wherein:

FIG. 1 is a partially broken-away side elevational view of a gas turbine designed in accordance with the prior art;

FIG. 2 is an enlarged diagrammatic illustration of how drive fluid typically enters the expander or drive section of the turbine of FIG. 1 and particularly how particle laden fluid would enter the expander;

FIG. 3 graphically illustrates the erosion characteristics of the upstream-most rotor when the turbine of the type illustrated in FIG. 1 is driven by particle laden fluids in the absence of the present invention;

FIG. 4 is a partially broken away side elevational view of a section of a gas turbine which incorporates the present invention; and FIG. 5 is an enlarged diagrammatic illustration of the present invention.

Turning now to the drawings, wherein like components are designated by like reference numerals throughout the various figures, attention is first directed to FIG. 1 which illustrates a conventional gas turbine generally indicated by the reference numeral 10. This turbine is shown including an air inlet section, an axial compressor, combustors, an expander section and an exhaust gas section. The expander section includes an outer housing 12 which defines an inner compartment 14 through which a drive shaft 16 indicated by dotted lines extends. A plurality of rotor blades 18 are fixedly connected to the shaft at axially spaced locations along its length within chamber 14. Also within the chamber are a plurality of fixedly mounted vanes 20 located between the rotor blades. These vanes are designed to act on a continuous stream of fluid entering chamber 14 through a defined path 22 within the combustor sectin of the turbine for causing the fluid stream to move axially through the chamber along a helical path around the drive shaft in order to engage the rotor blades in a way which causes the shaft to rotate about its own axis.

So long as the drive fluid entering the chamber 14 by means of path 22 is free of particulate material there is no fear of erosion to rotor blades 18 or vanes 20, especially the upstream-most blade and vane indicated at 18a and 20a, respectively. However, if the drive fluid is laden with particles there is a concern as specifically illustrated in FIG. 2 in conjunction with FIG. 3. FIG. 2 diagrammatically depicts the way in which particle laden fluid enters the chamber 14 and impinges on the upstream-most rotor blade and vane. The particle laden stream is generally indicated at 24 and is shown including particles 26. Note that the fluid stream enters the chamber with a relatively uniform particle distribution from regions radially closer to the axis of drive shaft 16 to further therefrom. As a result, if for purposes of discussion the rotor is separated into three radial segments, an inner hub segment closest to drive shaft 16, an outer tip segment furthest from the shaft, and a mid-span segment therebetween, a relative uniform concentration of particles would approach each of these segments. Eventually, the helical motion of the stream as it goes around the drive shaft during its axial movement through chamber 14 would cause more of the radially inward particles to move radially outward by centrifugal force so that downstream blades and vanes would experience higher particle impingement rates at tip regions and lower impingement rates at hub regions. However, this does not help significantly in reducing the erosion effects to upstream blades and vanes, especially the upstream-most ones 18a and 20a, respectively. Because of twist of the blades and vanes, gas velocities and particle impingement velocities, angles and rates vary for a uniform radical concentration of particles in a manner which produces substantially higher erosion rates at the inner hub segment of rotor blade 18a and corresponding segment on vane 20a. This is best exemplified by FIG. 3 which graphically displays relative trailing edge erosion rate versus particle diameter (in microns) at the hub, mid-span and tip segments of rotor blade 18a. For example, note that for a continuous stream laden with particles which are 6 microns in diameter, the erosion rate at the hub segment is greater than it is at either the mid-span or tip segments. With drive fluids containing 9 and 12 micron particles the erosion rate at the hub segment is substantially greater than it is at the mid-span or tip segments.

Referring to FIG. 4, attention is directed to a gas turbine which is designed to overcome the erosion problem discussed above. This turbine which is generally indicated by the reference numeral 10' may be identical to turbine 10 except for the way in which a particle laden stream of drive fluid enters chamber 14. Thus, turbine 10' may include the same type of expander section described above, that is one including a housing 12 deining a chamber 14, a drive shaft 16 within the chamber fixedly carrying a plurality of longitudinally spaced rotor blades 18 between fixed vanes 20. Turbine 10' also includes its own entry path 22 within its combustor section through which particle laden fluid 24 is directed in order to enter chamber 14. Moreover, the particles within the fluid moving through this path may be distributed in the uniform way illustrated in FIG. 2, that is, with approximately equal numbers of particles being radially closer to the shaft as those further away. However, in accordance with the present invention, turbine 10' includes an arrangement generally indicated at 28 which is located within shaft 22 immediately upstream from the upstream-most 18a and vane 20a for acting on the stream in a way which redistributes its particles outward in a radial direction.

Turning to FIG. 5, arangement 28 is shown in greater detail. As seen there, this arrangement is comprised of a continuous spiral tube 30 which is disposed coaxially around the axis of drive shaft 16 immediately upstream from vane 20a. This tube includes an inlet end 32 in fluid communication with the downstream-most end of path 22 and an outlet end 34 opening into chamber 14. In the particular embodiment illustrated, the tube defines two turns between its inlet and outlet end, although a greater number could be provided. As particle laden fluid 24 enters its inlet end 32, it is moved through the two turns of the tube and leaves outlet 34 along a spiral path which is continued by vane 20a and the downstream vanes in the manner described above. However, while the fluid is in tube 30, the centrifugal forces acting on the particles due to the motion of the stream through the tube's turns, causes the particles to be redistributed non-uniformly in the radial direction before reaching vane 20a so that lower concentrations are in the hub regions than at the tip regions. This is best exemplified in FIG. 5 which shows a uniform inward distribution of the particles as the fluid enters the inlet end of tube 30 whereas the particle distribution increases radially as the fluid exits the tube. In a preferred embodiment of the present invention, arrangement 28 is designed to provide this ideal result. The particular configuration of the tube 30 to accomplish this will vary with the overall parameters of the turbine and the characteristics of the particle laden fluid used to drive the turbine. One with ordinary skill in the art to which the present invention pertains could readily provide the appropriate design of tube 30 to provide uniform radial distribution of the drive fluid in view of the teachings herein. Under these ideal conditions, the relationship between relative trailing edge erosion rate and particle diameter would be the same at the all radial segments of the upstream-most rotor blade, and thus a graph representing this would have only one line corresponding to the mid-span line in FIG. 3 rather than the three lines shown there.

While the present invention is especially suitable for use with gas turbines, it is to be understood that other devices which are driven by particle laden fluid could benefit from the present invention.

What is claimed is:

1. A fluid flow driven apparatus, comprising:
   (a) means including an elongated drive shaft mounted for rotation about its own axis and one or a plurality of rotors fixedly connected to said shaft at axially spaced locations along its length;
   (b) means defining a compartment for containing at least that portion of said drive shaft supporting said rotors;
   (c) means for directing a continuous fluid stream, laden with particles, into said compartment;
   (d) flow deflecting means within said compartment for causing the fluid stream entering therein to move axially therethrough along a helical path around said shaft in order to engage said rotors in a way which causes said shaft to rotate about its axis; and
   (e) particle redistribution means comprising a fixed continuous spiral tube acting on said fluid stream at a location upstream of said rotors in a way which places more particles within the stream radially further from the axis of said drive shaft as the fluid initially moves into said helical path than would be the case without said particle redistribution means, whereby to redistribute said particles radially outwardly relative to said drive shaft as they engage said rotors in order to decrease rotor wear closer to said shaft.

2. An apparatus according to claim 1 wherein each of said rotors may be separated for sake of description into three equal radial segments, an inner hub segment closest to said shaft, an outer tip segment furthest from said shaft and a mid-span segment therebetween, wherein without said particle redistribution means nearly the same percentage o said particles within said stream would engage the hub segment of the most upstream one of said rotors which is most prone to erosion than its mid-span or tip segments which are less prone to erosion, and wherein said particle redistribution means redistributes said particles so that they engage said upstream-most rotor in a manner that results in approximately uniform erosion along its radius, thereby lowering the maximum blade erosion.

3. An apparatus according to claim 2 wherein said particle re-distribution means includes means for directing said fluid stream along its own spiral path before reaching said upstream-most rotor whereby to centrifugally redistribute the particles in said stream radially outwardly before they reach said last-mentioned rotor.

4. An apparatus according to claim 1 including means cooperating with all of the means recited in claim 1 to form a gas-powered turbine.

* * * * *